United States Patent [19]

Nicolson

[11] Patent Number: 4,894,917
[45] Date of Patent: Jan. 23, 1990

[54] CUTTING MEANS

[75] Inventor: Peter J. Nicolson, Comberton, England

[73] Assignee: C4 carbides (International) Limited, Cambridge, England

[21] Appl. No.: 336,033

[22] Filed: Apr. 11, 1989

[30] Foreign Application Priority Data

Apr. 12, 1988 [GB] United Kingdom ................ 8808601

[51] Int. Cl.⁴ .............................................. B26B 9/02
[52] U.S. Cl. ...................................... 30/346; 30/350; 51/357; 93/935; 125/18
[58] Field of Search ................................... 30/392–394, 30/350, 357, 346, 166 R; 83/786, 835, 837, 801; 51/357, 293; 125/16 R, 18

[56] References Cited

U.S. PATENT DOCUMENTS 2,735,685 2/1956 Karr ................................... 30/392 X
3,553,905 1/1971 Lemelson ........................... 30/350 X
4,448,432 8/1984 French ............................... 30/392 X
4,643,740 2/1987 Nicolson ............................... 51/293

Primary Examiner—Douglas D. Watts
Attorney, Agent, or Firm—Charles D. Gunter, Jr.

[57] ABSTRACT

The present invention provides a saw blade for use in a jig saw mechanism in which a drive member is caused to reciprocate axially and to reciprocate a saw blade carried by one end only thereof on said drive member, which saw blade comprises:

a. an axially elongated generally rod-like blade member having a grit edge cutting surface thereto, one end of said blade member being secured into a blade mounting member;

b. a blade mounting member comprising an axial socket into which the end of the blade member is secured; and c. a securing member extending axially from the said mounting member and adapted to be secured to the reciprocating drive member of a jig saw mechanism.

10 Claims, 3 Drawing Sheets

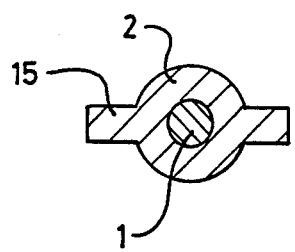
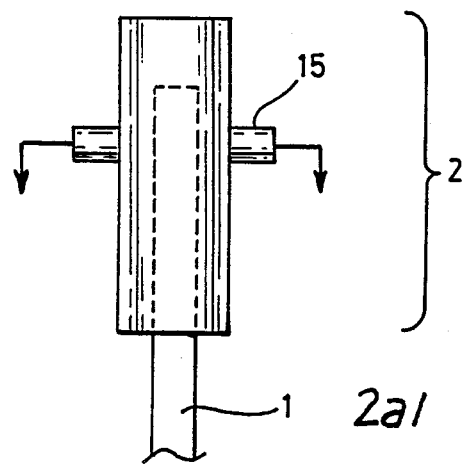
Figure 2a  2a/
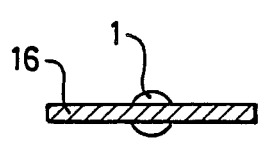
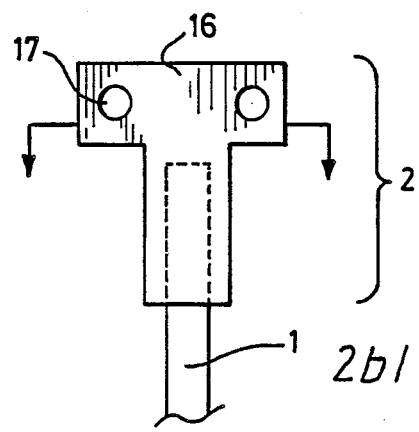
Figure 2b  2b/
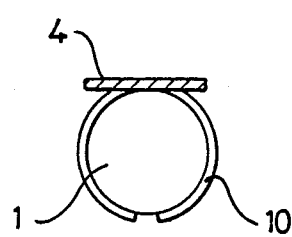
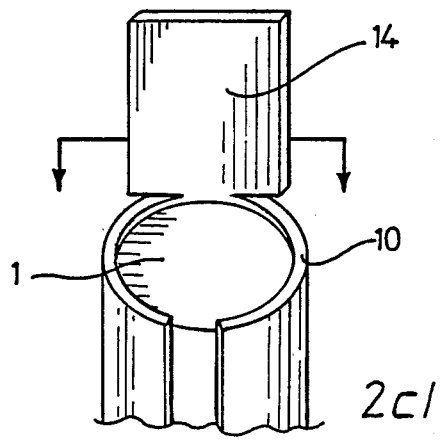
Figure 2c  2c/

CUTTING MEANS

The present invention relates to a cutting means, notably to the use of a rod saw as a jig saw blade.

BACKGROUND TO THE INVENTION

It is known to manufacture rod saw blades by brazing particles of a diamond-like substance, such as tungsten carbide, onto a steel or similar rod so that the tips of the particles project from the braze layer to provide a myriad of cutting edges. Such rod saws find widespread use in hacksaws and the like where the blade is stretched across the jaw of a blade holder and the two ends of the blade are held at the free ends of the arms forming the jaw and tension is applied to the blade to hold it taut.

We have now found that a rod saw lends itself particularly to use as a jig saw blade which is reciprocated axially by a suitable mechanism, for example a conventional electrically powered jig saw. This discovery enables one to makes use of the ability of a rod saw to cut in any direction normal to the longitudinal axis of the blade in operations for which a hacksaw or the like is not suitable. This enables the jig saw to cut in all directions without the need for special mechanisms to permit rotation of the cutting blade as with some present forms of electrical jig saw. Furthermore, since the rod saw presents a cutting edge in all directions radially, it can cut complex shapes with immediate changes in direction of the cut without the need to provide dead areas within which the saw blade can be maneuvered so as to present its cutting face in a new direction. The invention thus enables a user to cut more complex shapes than hitherto with mechanical tools and with a low percentage of wasted material.

SUMMARY OF THE INVENTION

Accordingly, the present invention provides a method for cutting a material which comprises reciprocating the cutting edge of an axially elongated generally rod-like cutting blade against the material, characterised in that the blade is an axially elongated rod-like member having a grit edge cutting surface layer thereto, the blade being supported at or adjacent only one end thereof and being reciprocated axially by suitable means.

Preferably, the blade is a rod saw having a substantially circular cross-section and having a tungsten or similar grit particle layer applied substantially uniformly over the external surface of the rod and secured in position by means of a braze layer through which the tips of the grit particles project. The blade has at or adjacent only one end thereof a mounting means by which the blade can be secured in the blade receiving mounting of a conventional reciprocating electrical jig saw mechanism.

The invention further provides a jig saw blade which comprises an axially elongated generally rod-like blade member having a grit edge cutting surface thereto, one end of said blade member being secured into a blade mounting member; said blade mounting member comprising an axial socket into which the end of the blade member is secured and a blade securing member extending axially from the said socket and adapted to be secured to the reciprocating drive member of a jig saw.

Preferably, the jig saw mechanism comprises a mechanical means for axially reciprocating a shaft or similar member to which the saw blade of the invention is securely attached; and carries a sole plate which bears against the face of the material being cut and through an aperture in which the saw blade protrudes during use. The axial socket member of the blade of the invention preferably extends to adjacent the sole plate of the jig saw during use so as to receive and support the saw blade against excessive flexing during use.

Alternatively, the blade mounting can be provided with a flexible portion intermediate the axial socket for the end of the saw blade and that end of the mounting to be received in the blade securing member of the jig saw, which intermediate flexible portion is adapted to allow the saw blade to be deflected from the axis of the mounting and thus absorb excessive loads upon the free end of the saw blade during use.

The invention can be applied to a wide range of jig saws and the term jig saw is used herein to denote a saw mechanism in which an axially elongated blade is held at or adjacent one end thereof in the saw with the other end free; and the blade is reciprocated axially by the saw. However, the invention is of especial application to jig saws where the saw blade is held terminally upon a shaft which is reciprocated axially by an electric motor.

DESCRIPTION OF THE DRAWINGS

For convenience, the invention will be described with respect to this preferred form of jig saw and with respect to the accompanying drawings, in which

FIG. 2 is a diagrammatic side view and accompanying p view from above of three alternative forms of the blade mounting of FIG. 1.

DESCRIPTION OF THE PREFERRED EMBODIMENTS OF THE INVENTION

The blade of the invention comprises a rod saw component 1 carried axially by a support ferrule 2 which is to be held securely by the jig saw mechanism.

The rod saw 1 can be a conventional grit coated rod or wire, notably one which has had a tungsten carbide grit coating bonded thereto by a brazing technique. The preferred method of forming the braze bond is that described and claimed in our European and U.S. Pat. Nos. 179,602 and 4,643,740, the subject matter of which is hereby incorporated by reference. For convenience, the invention will be described hereinafter in terms of a substantially cylindrical mild steel or similar rod having a tungsten carbide grit edge coating brazed thereto.

The blade 1 preferably has a simple cylindrical end portion which is secured into the ferrule 2 and which does not carry the grit coating which provides the cutting edge to the remainder of the length of the blade. As indicated below, this end of the blade 1 can be flattened or otherwise formed with a non-circular cross-section to assist location of the blade within the ferrule 2 and its anchorage therein. The free end of the blade 1 can be given a sharpened or pointed end to assist initial penetration of the saw into the material to be cut.

Figure 1:
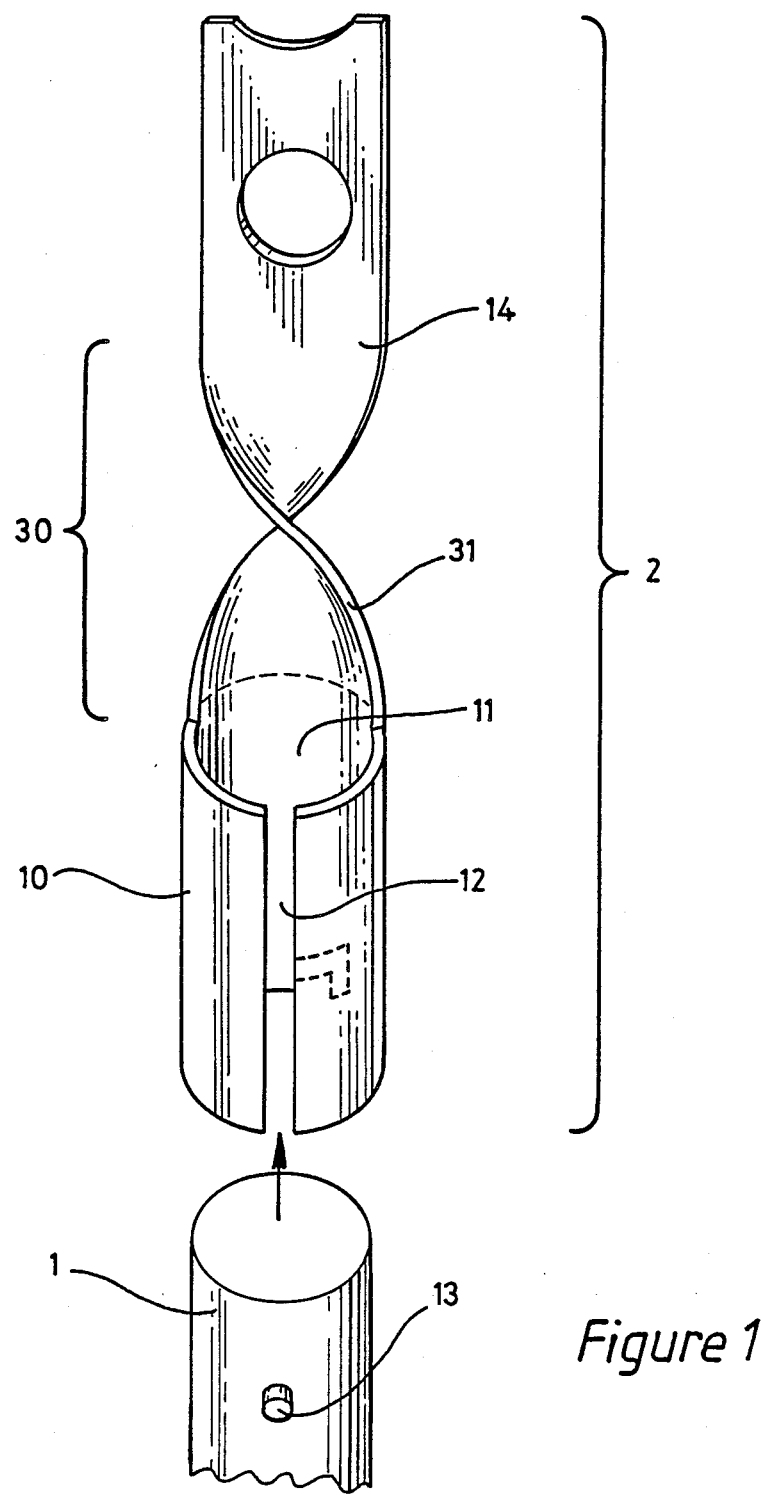
FIG. 1 is a diagrammatic perspective view of one form of the blade mounting of the invention.

The support ferrule 2 by which the rod 1 is held by the jig saw can take a number of forms, depending upon the type of mounting present on the distal end 3 of the reciprocating shaft 4 of the jig saw. However, in all cases, the support ferrule typically comprises a sleeve member 10 having an axial socket 11 into which one end of the rod saw blade 1 is secured so that the blade extends axially from the socket. The socket 11 is conveniently merely a cylindrical socket into which the end of the blade is a firm push fit. However, other shaped sockets may be used where the end of the saw blade to be accommodated is not circular in cross section. Thus, it may be desired to flatten one face of the saw blade and to provide a corresponding flat to the face of the socket, so that the blade does not rotate during use. If desired, as shown in FIG. 1, the socket 11 can have one or more axial slits 12 in the wall thereof to allow the socket to expand radially to accommodate variations in the diameter of the blades 1. These slits 12 may also serve to receive and guide radially projecting pins 13 carried by the shank of the blade 1, where the blade is secured into the socket 11 by means of a bayonet type fitting, as shown dotted.

The end of the blade 1 is held securely within the socket 11 by any suitable means, for example removably by a bayonet type fitting as described above, or permanently by a transverse pin passing through both the socket wall and the blade, by adhesive or by brazing the blade to the material of the socket using conventional methods. The blade can be secured to the ferrule during manufacture of the blade where the securing is by brazing the blade into the socket. This method of manufacture also avoids the need to remove grit from the end of the blade to enable the blade to be inserted into the socket.

The free end of the ferrule 2 can take a number of forms having regard to the type of fitting at the distal end of the reciprocating shaft 4 of the jig saw. Thus, as shown in FIG. 1, the free end of the ferrule can be merely a flat axial tongue 14 which is inserted into a slot in the end of shaft 4 and secured in place by a clamping screw. FIG. 2 illustrates other suitable forms of ferrule for commonly used types of jig saw. Thus, as shown in FIG. 2a, the outer face of the ferrule 2 can carry radial pins 15 which co-operate with a socket in the end of the shaft 4 having internal guides slots whereby the ferrule is secured by a bayonet type mounting. As shown in FIG. 2b, the ferrule can have an axially extending plate 16 which is secured onto a face of a block carried by the shaft 4 by means of screws or the like passing through holes 17 in the plate. As shown in FIG. 2c the tongue 14 can be carried directly by the socket 10, rather than via an intermediate section as shown in FIG. 1.

In the version of the mounting shown in FIG. 1, a flexible portion 30 is provided intermediate the sleeve 10 and the free end of the ferrule. The function of the flexible portion is to allow the free end of the blade 1 to deflect away from the axis of the mounting during use and thus absorb excessive loads or the impact of sudden loads applied to the blade. Whilst a conventional rod saw blade will flex, such flexing occurs immediately adjacent where the blade enters the socket 11 of the ferrule and this may impose a fatigue stress upon the blade at this point. The fatigue stress occurs particularly when the blade has been improperly annealed after the heating of the brazing process, especially where the blade is made from a hardened tool steel. The presence of the flexible portion 30 reduces the risk of breakage of the blade.

The flexible portion 30 can be made from a material which suffers less from fatigue stress that the material of the blade 1 and can be designed specifically to reduce stress fatiguing of the mounting at this point. Thus, the flexible portion can be in the form of a leaf or coil spring having one or more turns and carrying the sleeve 10 and the flattened tongue 14 at opposed ends thereof.

However, a particularly preferred form of flexible portion 30 is a strip of the material forming the sleeve 10 and the axial tongue 14 linking these two axially and having a 360° twist 31 therein. Thus, the mounting can be made as a unitary construction from a strip of spring steel or the like by forming the sleeve 10 at one end thereof, twisting the strip through 360° about its longitudinal axis to form the twist 31, and then forming the tongue 14 or other form of securing means, eg. a hook or bayonet fitting, in the other end of the strip. Such a mounting is simple and cheap to fabricate and its material of construction can be selected to best suit the stresses to be imposed upon it, whereas the rod saw requires to be made from a limited selection of materials to be suitable for brazing the cutting grit thereonto.

In the alternative forms of mounting shown in FIG. 2, the ferrule 2 extends to closely adjacent the upper surface of the sole plate or the upper surface of the workpiece being cut so that the blade 1 is supported by the ferrule over all but the exposed length of the blade during use. This support reduces the flexing of the blade and reduces the risk of breakage of the blade.

Figure 3:
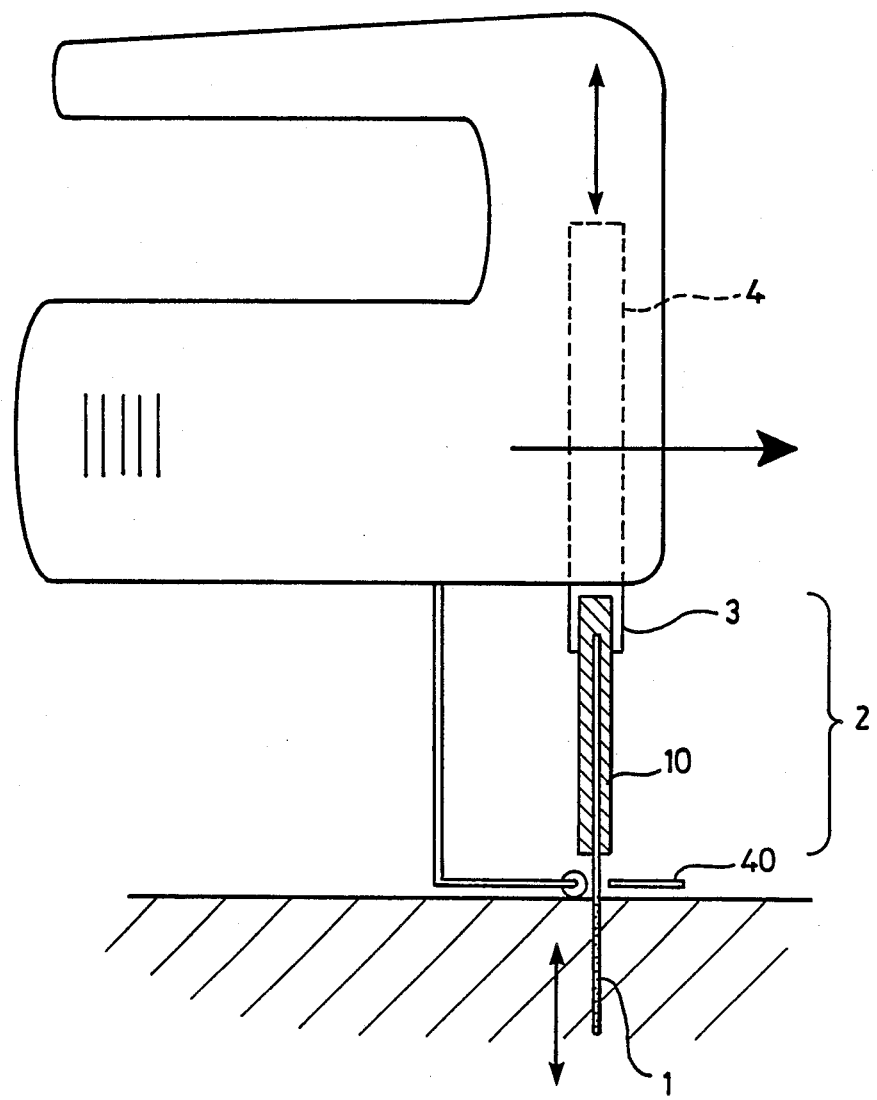
FIG. 3 is a diagrammatic side elevation of a blade of the invention mounted in a jig saw.

As stated above, the blade 1 extends through an aperture, usually a V cut out, in a sole plate 40 carried by the jig saw and which bears against the upper surface of the material being cut, as shown in FIG. 3. It will be appreciated that the ferrule 2 must not foul the sole plate 40 or the upper face of the material being cut. The ferrule 2 therefore usually extends to the upper face of the sole plate 40 when the reciprocating shaft 4 of the saw has reached the downward extremity of its cutting stroke.

The above forms of the blade and its mounting can be fabricated from any suitable material and can be made separately and subsequently secured to one end thereof. Alternatively, the mounting can be fabricated and secured as a push fit onto the end of the saw blade, and the blade and mounting then brazed together during brazing of the grit cutting particles onto the surface of the rod.

The invention therefore provides a metallic rod-like member intended to form the substrate onto which diamond-like grit is to be brazed to form a cutting edge upon the member, the member having terminally and substantially co-axially mounted upon one end thereof a ferrule by which the blade member is to be secured to the distal end of the reciprocating member of a jig saw mechanism.

The invention also provides a method for making a saw blade of the invention which comprises applying a diamond-like grit and a brazing material coating to a metallic rod-like member of the invention and securing the grit and the ferrule to the rod-like member by heating so as to cause brazing of the particles to the surface of the rod-like member.

I claim:

1. A saw blade for use in a jig saw mechanism in which a drive member is caused to reciprocate axially and to reciprocate a saw blade carried by one end only thereof on said drive member, which saw blade comprises:
    a. an axially elongated generally rod-like blade member having a grit edge cutting surface thereto;
    b. a blade mounting member comprising an axial socket into which one end of the blade member is secured; and c. a securing member extending axially from the said mounting member and adapted to be secured to the reciprocating drive member of the jig saw mechanism.

2. A saw blade as claimed in claim 1 wherein the blade member is a rod saw having a substantially circular cross-section and having a tungsten carbide or similar grit particle layer applied substantially uniformly over the external surface of the rod and secured in position by means of a braze layer through which the tips of the grit particles project.

3. A saw blade as claimed in claim 1 wherein the mounting member and the securing member are provided by a ferrule member into which the blade member is mounted substantially co-axially to locate and support the blade member, and the ferrule member carries means by which it can be attached to the reciprocating drive member of the jig saw mechanism.

4. A saw blade as claimed in claim 1 wherein the blade mounting member extends axially to adjacent the point at which the blade member will be imbedded in the material being cut when the reciprocating drive member of the jig saw mechanism is at the downward end of its drive stroke, so as to receive and support the blade member against excessive flexing during use.

5. A saw blade as claimed in claim 1 wherein a flexible portion is provided intermediate the blade mounting member and the securing member, which intermediate flexible portion is adapted to allow the blade member to be deflected from the axis of reciprocation during use and thus absorb excessive loads upon the free end of the blade member.

6. A saw blade as claimed in claim 5 wherein a strip of material is formed to provide the blade mounting member and an axial tongue as the securing member, and a flexible portion linking these two axially and having a 360° twist therein.

7. A method for fabricating a saw blade as claimed in claim 1 wherein the blade member is inserted into the socket of the mounting member and secured in position.

8. A metallic rod-like member intended to form the substrate onto which diamond-like grit particles are to be brazed to form a saw blade as claimed in claim 1, the member having substantially co-axially mounted upon one end thereof a ferrule member by which the rod-like member is to be secured to a reciprocating drive member of a jig saw mechanism.

9. A method for making a saw blade as claimed in claim 1 which comprises applying coating of particles of a diamond-like grit material and a brazing material to a metallic rod-like member as claimed in claim 8 and securing the grit and the ferrule to the rod-like member by heating so as to cause brazing of the particles to the surface of the rod-like member.

10. A jig saw mechanism having mounted at the distal end of the reciprocating drive member thereof a saw blade as claimed in claim 1.

* * * * *